United States Patent [19]

Anderson et al.

[11] 4,372,020

[45] Feb. 8, 1983

[54] SLAG REMOVAL APPARATUS

[75] Inventors: Harry E. Anderson, Pittsburgh; Raymond E. Heasley, McKees Rocks, both of Pa.

[73] Assignee: Anderson Engineers, Inc., Carnegie, Pa.

[21] Appl. No.: 267,255

[22] Filed: May 26, 1981

[51] Int. Cl.³ .............................................. B08B 1/02
[52] U.S. Cl. ................................... 29/81 H; 29/81 J
[58] Field of Search .................... 29/81 R, 81 H, 81 J; 15/21 C, 21 D, 28, 77, 236 C; 125/3, 5

[56] References Cited

U.S. PATENT DOCUMENTS

| | | | |
|---|---|---|---|
| 1,391,882 | 9/1921 | Dworwiczak | 15/28 |
| 1,393,332 | 10/1921 | Wimmer | 15/28 |
| 1,656,324 | 1/1928 | Hamacheck | 29/81 J |
| 2,080,198 | 5/1937 | Brandenburg | 15/21 C |
| 3,351,046 | 11/1967 | Collins | 125/5 |
| 3,939,514 | 2/1976 | Cook | 15/21 C |

FOREIGN PATENT DOCUMENTS

1339266 11/1973 United Kingdom .

Primary Examiner—John McQuade
Attorney, Agent, or Firm—Webb, Burden, Robinson & Webb

[57] ABSTRACT

Apparatus for removing slag from the top surface of metal shapes including a conveyor belt and a pair of vertically adjustable impact units located above the conveyor belt. Each impact unit has an impact element head driven by an electric motor and is attached to a screw jack for adjusting its vertical position. The impact units and a portion of the conveyor belt are surrounded by a closed cabinet having inlet and outlet openings for the conveyor belt and the metal shapes carried thereon. The impact element head in each unit is a disc connected to a support plate. The disc has peripheral grooves in its surfaces and radially aligned pairs of holes connecting the grooves throughout the circumference of the disc with a flexible steel cable extending from the groove in one surface of the disc through each pair of radially aligned holes and through the groove in the other surface of the disc so that its ends extend past the surface of the disc to contact slag on the top surface of metal shapes passing below the impact heads on the conveyor belt.

17 Claims, 8 Drawing Figures

SLAG REMOVAL APPARATUS

BACKGROUND OF THE INVENTION

1. Field of the Invention

The present invention relates to apparatus for removing slag from the surface of metal shapes by the application of a substantially horizontal force to the slag.

When burning equipment is used to cut metal into desired shapes, a slag is formed on the surface of the shapes with a buildup along the cut edges of the shape. Slag formed during plasma arc and oxyfuel burning is extremely adherent to the metal and its hardness is inconsistent. This slag is difficult and expensive to remove by conventional apparatus such as abrasive belts or grinding wheels because the belts and wheels wear rapidly and unevenly. Manual chipping is impractical for removing slag created by plasma arc and oxyfuel burning because of the adherence of the slag to the metal. It is important that the slag created by burning be removed rapidly so that an efficient continuous in-line operation is maintained.

2. Description of the Prior Art

Apparatus wherein metal shapes are carried beneath a grinding wheel or an abrasive belt to remove slag by abrasion are known in the prior art. When an abrasive belt is used, grooves are rapidly worn in the belt where the belt contacts the slag buildup, and, hence, the belt must be replaced after slag has been removed from only a small number of workpieces. Abrasive belts are expensive and the cost of frequently replacing belts is prohibitive. The use of grinding wheels is likewise expensive as the wheels tend to wear rapidly and unevenly. Manual chipping of slag from a workpiece is also known but is impractical because of the expense and time involved and because the varying consistency of the slag and the adherence of the slag to the metal cause the edges of the metal shape to break off which destroys the shape.

An example of apparatus wherein metal shapes are carried beneath a rotating abrasive wheel on a continuous belt to grind a surface of the shape is British Patent No. 1,339,266. The grinding wheel in the apparatus disclosed in this patent is vertically adjustable so that the amount of material removed may be controlled. As stated above, grinding machines of this type are impractical for removing slag created by burning since the wheel breaks down and must be replaced at frequent intervals.

SUMMARY OF THE INVENTION

According to the present invention, apparatus is provided wherein metal shapes with the slag side up are moved on a continuous conveyor belt beneath rotary impact element heads having a plurality of extending resilient impact members so that slag buildup from burning is broken from the shapes by a substantially horizontal force which is applied to the slag in a direction substantially parallel to the upper surface of the shapes. The resilient extending impact members are elongated strands of woven steel cable. The steel cables contact slag which is built up on the upper surface of the shapes as the impact head rotates to knock off the slag. Since the force applied to the slag is mainly horizontal parallel to the surface of the shapes and since the steel cables have some flexibility, edges of the shapes are not broken off.

The impact units which are a part of the invention are vertically adjustable so that shapes of different thicknesses can be accommodated. The impact heads have a diameter so that they overlap the center line of the conveyor belt whereby all of the surface area of the belt is covered by steel cables extending from the impact heads. The apparatus includes a closed rubber sealed cabinet surrounding the impact area of the conveyor belt which is attached to a vacuum pump and a dust collector to remove dust and particulate material knocked off of the shapes by the steel cables.

The present invention will be best understood from a consideration of the accompanying drawings wherein like reference numerals are used to identify like parts in each of the drawing figures.

Figure 1:
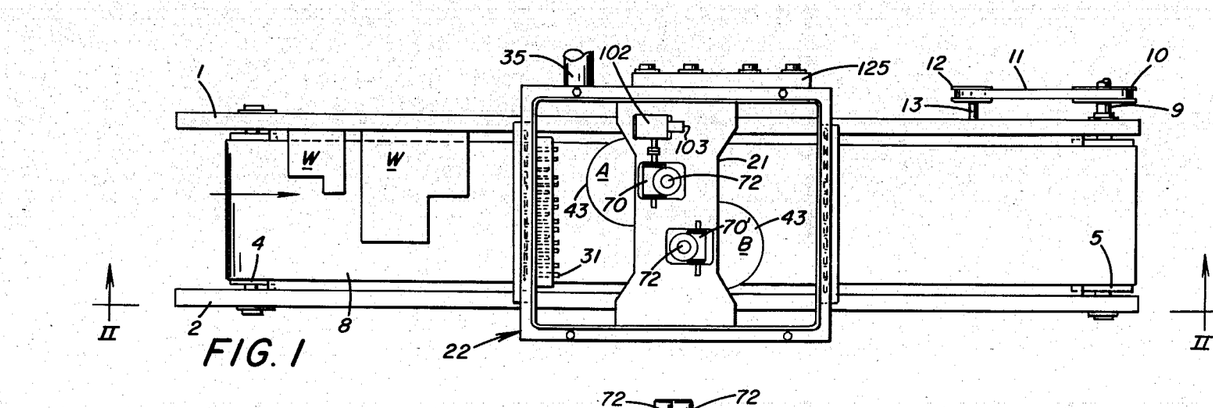
FIG. 1 is a schematic plan view of the apparatus of the invention with the cabinet cover removed and the control linkage eliminated.
Figure 2:
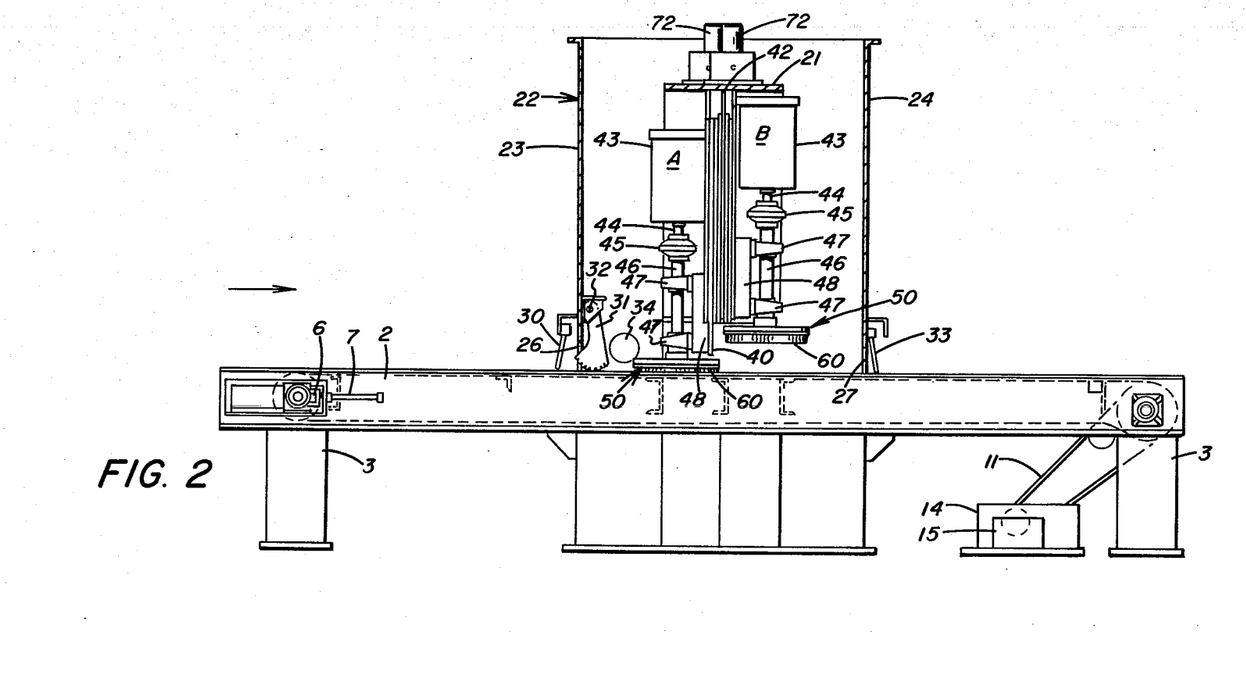
FIG. 2 is a vertical section on line II—II of FIG. 1.
Figure 3:
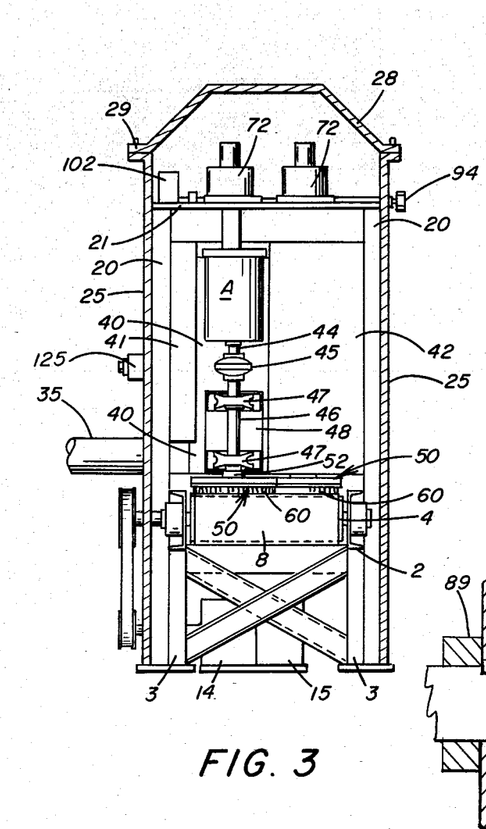
FIG. 3 is a vertical section through the impact area of the apparatus with the cabinet cover in place.

With reference to FIGS. 1-3 of the drawings, the apparatus of the invention has a pair of spaced horizontal side rails 1 and 2 supported on legs 3 which rest on the floor. The side rails support an inlet end conveyor roll 4 and an outlet end conveyor roll 5 at their ends. Each end of inlet end conveyor roll 4 is mounted in a bearing carried in a movable bracket 6 mounted in horizontal tracks on a side rail. Each bracket 6 may be moved along its tracks longitudinally of the side rail by a threaded adjustment member 7 in order to vary the tension on a continuous conveyor belt 8 carrying metal shapes W. Each end of outlet end conveyor roll 5 is mounted in a bearing supported on the side rails. The shaft 9 for roll 5 carries a sprocket 10 which is driven by a chain 11. Drive chain 11 is driven by a sprocket 12 mounted on a shaft 13 extending from a gear reducer 14 which is driven by an electric motor 15 mounted on the floor. Roll 4 is an idler roll.

Located approximately midway along conveyor belt 8 is a standard having vertical support members 20 located on the outside of side rails 1 and 2 and extending from the floor upwardly above side rails 1 and 2. A horizontal across member 21 extends between and is welded to the upper ends of vertical support members 20. A cabinet 22 having a front wall 23, a back wall 24 and side walls 25 surrounds the impact area of the conveyor belt and is attached to vertical support members 20. the side walls of the cabinet extend below side rails 1 and 2 to the floor, and the front and back walls of the cabinet terminate above conveyor belt 8 so that an elongated inlet opening 26 and an elongated outlet opening 27 are formed to permit shapes W to pass through the cabinet beneath the impact element heads. The cabinet also has a cover 28 with a flange 29 which is bolted to a flange at the upper end of the walls.

Inlet opening 26 in cabinet 22 is provided with a plurality of closely spaced downwardly extending flexible flaps 30 of rubber to retain dust and particulates within the cabinet. However, when shapes W are moving into the cabinet on conveyor belt 8, flaps 30 are bent upwardly and inwardly by contact with the shapes to permit the shapes to enter the cabinet. In addition to flexible flaps 30, inlet opening 26 is provided with a plurality of anti-kick members 31 which are mounted on a horizontal bar 32 located above the inlet opening and are spring loaded in the downward position. Members 31 are spaced throughout the length of inlet opening 26 and are provided with serrations on their lower edge so that when a shape is moving into the cabinet through inlet opening 26, the anti-kick members will be rotated upwardly about bar 32. After a shape has passed into the cabinet toward the impact heads, members 31 are rotated into the downward position by the spring loading to prevent a shape from accidentally being thrown out of inlet opening 26 by contact between the shape and an impact head. This is important in order to prevent injury to an operator at the inlet end of the apparatus. Outlet opening 27 is also provided with closely spaced downwardly extending flexible flaps 33 of rubber to retain dust and particulates within cabinet 22. The cabinet joints are rubber sealed and an exhaust opening 34 is formed in a side wall 25 for connection with a conduit 35 which is connected with a vacuum pump and a dust collector (not shown). A fan (not shown) is provided at the top of cabinet 22 to blow dust downwardly where it is removed through opening 34 and conduit 35 by the vacuum pump to the dust collector.

Impact units A and B are identical and only one unit is described hereinafter. The unit includes a slide 40 mounted in vertical track members 41 attached to a vertical plate 42. Vertical plate 42 extends across the width of conveyor belt 8 and is attached to vertical support members 20 and to cross member 21. The bottom of the vertical plate is spaced above conveyor belt 8 so that shapes W carried on conveyor belt 8 can pass below the lower edge of the vertical plate.

Figure 6:
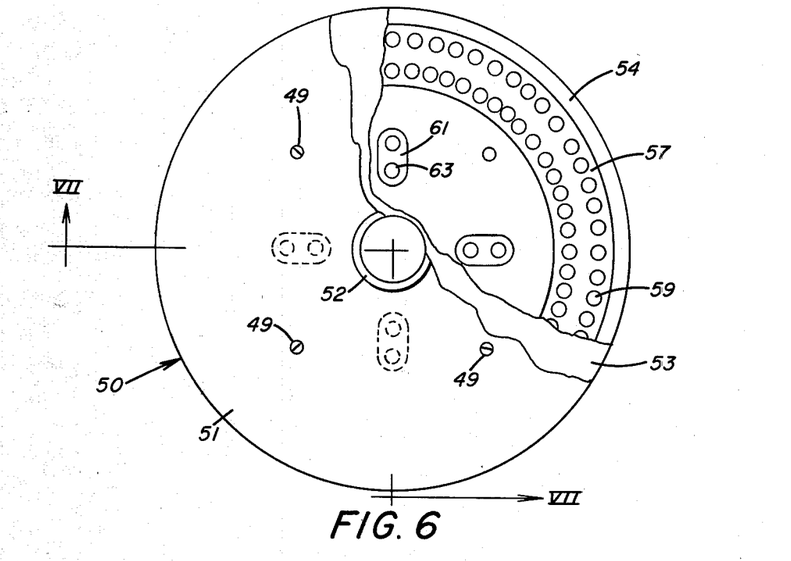
FIG. 6 is a plan view of an impact head with part of the cover plate and the support plate broken away.
Figure 7:
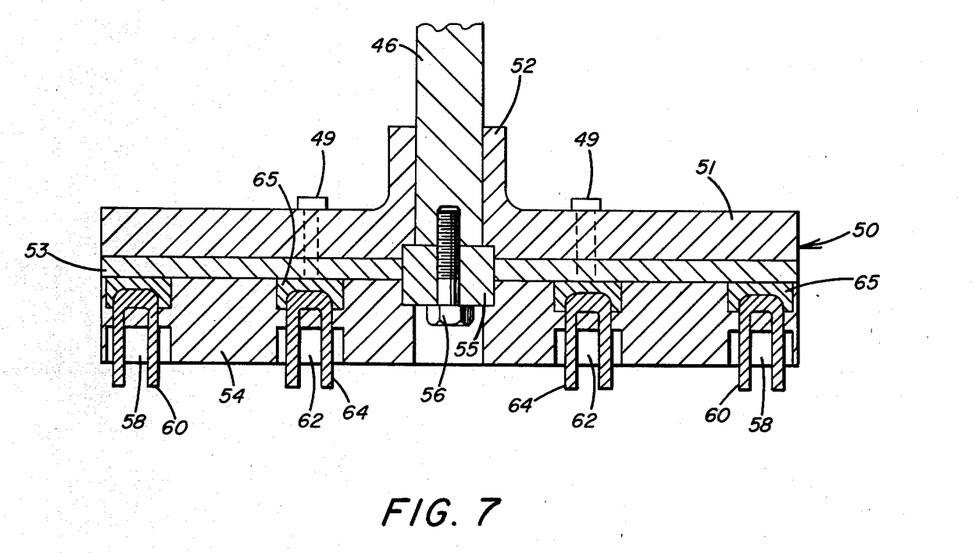
FIG. 7 is a section on line VII—VII of FIG. 6.

Impact unit A is located on the inlet side of vertical plate 42, and impact unit B is located on the outlet side of vertical plate 42. The diameters of the impact element heads are such that they overlap each other at the center line of conveyor belt 8 in order to cover the full width of the conveyor belt and thereby insure that a shape W traveling on the conveyor belt will be contacted by steel cables extending from an impact element head. Slide 40 supports an electric motor 43 at its upper end. A drive shaft 44 extends downwardly from motor 43 to a coupling 45. A shaft 46 extends downwardly from the bottom of coupling 45, and an impact element head 50 is attached to the lower end of shaft 46. The shaft 46 is journaled in bearings (not shown) which are supported in brackets 47 attached to a block 48 which is mounted on slide 40. Impact element head 50 is shown in detail in FIGS. 6 and 7 and has a support plate 51 with a hub 52 which is attached to the lower end of shaft 46. A cover plate 53 is located immediately below plate 51, and a disc 54 is located below cover plate 53. The diameters of plates 51 and 53 and disc 54 are the same. In order to align plates 51 and 53 and disc 54 during assembly of an impact head 50, a fit piece 55 is located in recesses in plate 51 and disc 54 and in a center hole in cover plate 53. A bolt 56 extends through a central hole in fit piece 55 and is threaded into a hole in the end of shaft 46 to hold the impact head on the shaft. Plates 51 and 53 and disc 54 are held together by cap screws 49 which extend downwardly through the plates into the disc. Disc 54 is provided with a continuous circumferential groove 57 close to its outer edge in the upper surface and a continuous circumferential groove 58 close to its edge in the lower surface. The grooves are aligned. Pairs of radially aligned holes 59 are located on radii of disc 54 spaced apart every 6 degrees around the disc. The holes extend between grooves 57 and 58, and a continuous woven steel cable 60 extends through each pair of radially aligned holes 59 with the ends of the cable extending downwardly below the lower surface of disc 54. In addition to the grooves close to the circumference of disc 54, there are four elongated recesses 61 in the upper surface of disc 54 arranged at 90 degrees to each other and located between the center of the disc and inner edge of groove 57. Elongated recesses 62 are located in the lower surface of the disc in alignment with recesses 61. Within each recess 61 and 62 a pair of radially aligned holes 63 is located on a radius of the disc and extends between the recesses. A continuous woven steel cable 64 extends through holes 63 with both of its downwardly extending ends located below the bottom surface of disc 54. Steel cables 60 and 64 are maintained in position in the disc by babbitt metal 65 which is poured into groove 57 and into recesses 61. When it is necessary to remove a worn steel cable, the babbitt metal is heated and removed, and the worn steel cable is removed and replaced with a new steel cable.

Figure 4:
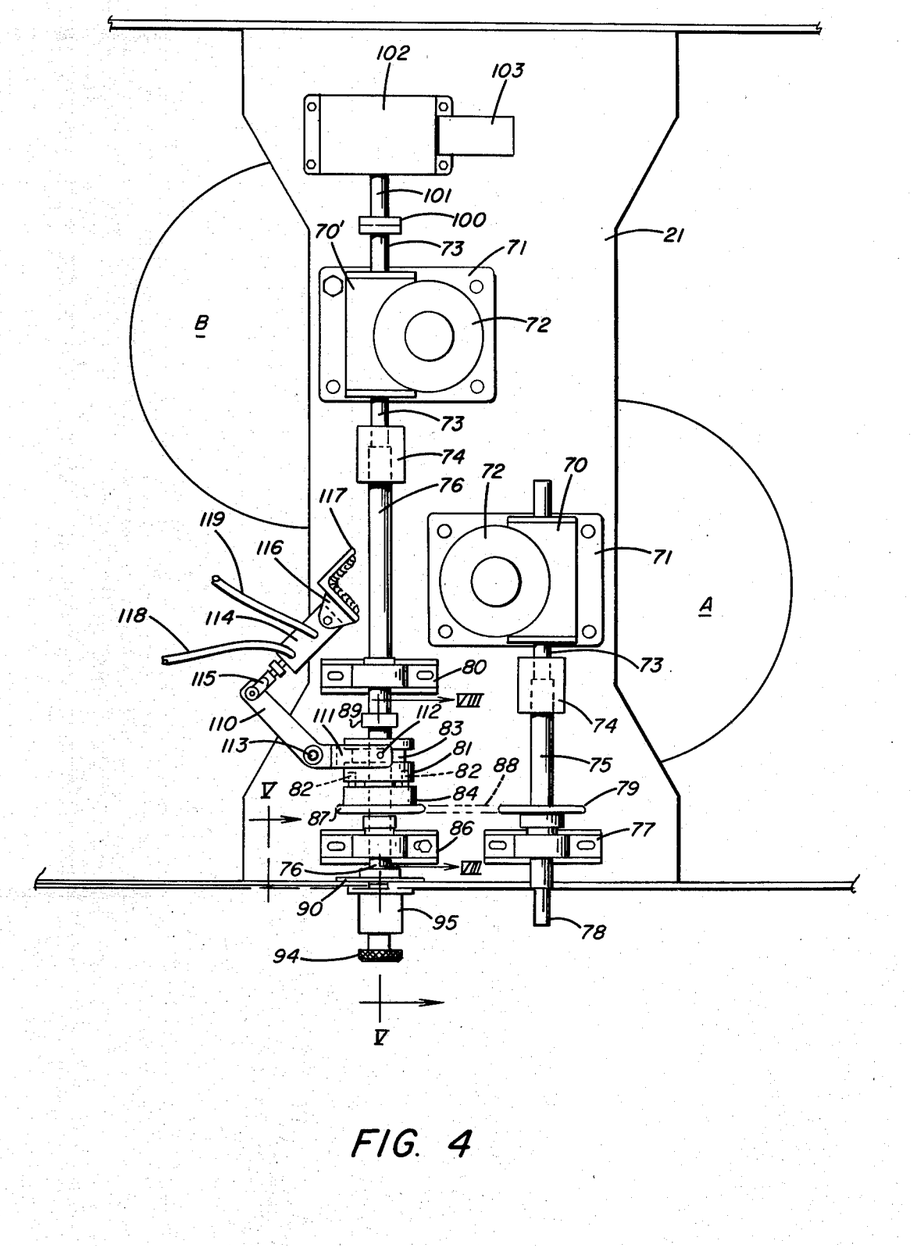
FIG. 4 is a plan view of the control linkage and drive apparatus for raising and lowering the impact units.
Figure 5:
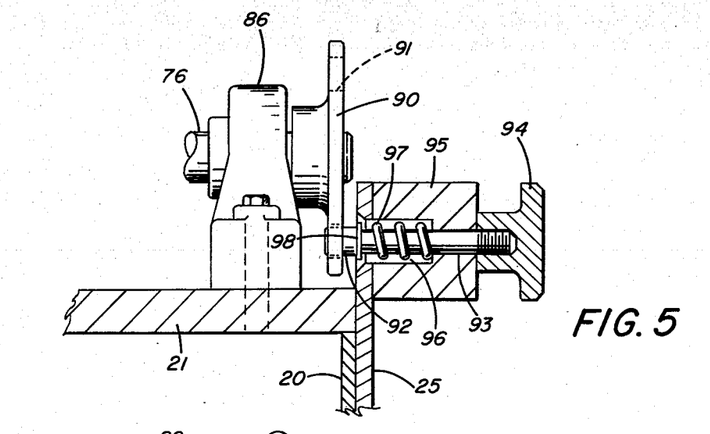
FIG. 5 is a section on line V—V of FIG. 4.

Vertical adjustment of impact units A and B is affected by the arrangement shown in detail in FIGS. 4 and 5 of the drawings. A Joyce Cridland Model NJ 65 screw jack 70 for unit A and 70' for unit B is mounted on a plate 71 which is bolted to cross member 21. The screw jack includes a vertical worm gear which is connected to slide 40 of an impact unit so that rotation of the screw jack worm gear raises or lowers the associated impact unit. The worm gear is covered by a cap member 72 to keep out dirt. A drive shaft 73 extends from each screw jack and is attached to a coupling 74 which is in turn attached to a second shaft. Drive shaft 73 for screw jack 70 is coupled to a shaft 75, and drive 73 for screw jack 70' is coupled to a shaft 76. Shaft 75 is supported at its outer end in a bearing in a pillow block 77 which is bolted to cross plate 21. The end of shaft 75 has a square head 78 to accommodate a crank (not shown) to manually turn shaft 75 and thereby rotate coupling 74 and shaft 73 to turn screw jack 70 and adjust the vertical position of impact unit B. A sprocket 79 is fixed to shaft 75.

Figure 8:
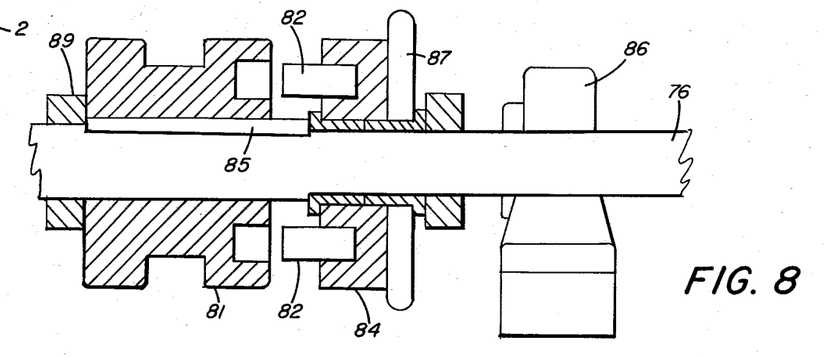
FIG. 8 is a section on line VIII—VIII of FIG. 4.

Shaft 76 extends through bearings in pillow blocks 80 and 86 bolted to cross member 21. The portion of shaft 76 between the pillow blocks carries a clutch member 81 having four openings angularly spaced by 90°. Clutch member 81 has a circumferential external slot 83 for engagement with a clutch actuator. A second clutch member 84 is also carried on the portion of shaft 76 between pillow blocks 80 and 86. One face of clutch member 84 has four pins 82 angularly spaced by 90° adapted to enter the openings in clutch member 81 when the clutch is engaged, and a sprocket 87 is mounted on the opposite face of clutch member 84. Shaft 76 carries an elongated longitudinal key 85 which is in constant engagement with a keyway in clutch member 81 so that clutch member 81 rotates with shaft 76 and is free to move longitudinally along shaft 76 between a collar 89 fixed to shaft 76 and clutch member 84. Clutch member 84 is mounted on a bearing in engagement with shaft 76 so that clutch member 84 and attached sprocket 87 do not rotate with shaft 76 when pins 82 are disengaged from the openings in clutch member 81. The bearing for clutch member 84 is spaced from pillow block 86 by a collar on shaft 76.

A locking plate 90 with a plurality of equally spaced holes 91 around its periphery is attached to the outer end of shaft 76 on the opposite side of pillow block 86 from clutch member 84. The locking plate and associated apparatus is shown in detail in FIG. 5. Holes 91 cooperate with end 92 of a spring loaded locking pin 93 having a knob 94 threaded to one end. The intermediate portion of locking pin 93 is located within a lock base 95 having a recess 96 to accommodate a spring 97 which surrounds a portion of pin 93 and is held in place by a washer 98 which is located on the pin adjacent to end 92. When knob 94 is pulled outwardly, spring 97 is compressed and end 92 of locking pin 93 is removed from a hole 91 in locking plate 90 so that shaft 76 may be turned by a chain 88 extending between sprockets 79 and 87 by rotation of sprocket 79 and shaft 75 by a crank to raise or lower the impact units. When the units have been adjusted so that impact element heads 50 are at the desired distance above conveyor belt 8, knob 94 is released so that pin end 92 fits into a hole 91 in locking plate 90 to lock the impact units in place.

The end of drive shaft 73 for screw jack 70' opposite to the end connected to coupling 74 is connected to a standard clutch 100 which is also connected to a drive shaft 101 from a gear reducer 102 which is bolted to cross member 21. Gear reducer 102 is driven by an electric motor 103 which is also bolted to cross member 21. When the impact units are raised or lowered a substantial distance, the locking mechanism is disengaged by pulling out knob 94 to disengage end 92 of pin 93 and from a hole 91, and clutch 100 is engaged and electric motor 103 is started to simultaneously raise or lower the impact units through gear reducer 102, shaft 101 and clutch 100. When the impact units are to be moved a relatively short distance, they are manually adjusted. Clutch 100 is disengaged to disengage the gear reducer from drive shaft 73 during manual adjustment of the impact units. Normally both impact units are raised and lowered simultaneously either by electric motor 103 or by a crank fitted onto square end 78 of shaft 75.

The steel cables on impact unit A will wear more rapidly than those on impact unit B since the steel cables on impact unit A will come into contact with more shapes W to remove the slag therefrom. The reason for this is that the shapes W are placed on conveyor belt 8 with an edge against left side rail 1 which is the guide rail. Hence, the steel cables on impact unit A will contact all of the smaller shapes as well as all of the shapes which are large enough to be contacted by the steel cables of both impact units. In order to independently adjust the vertical position of impact unit B to compensate for wear of the steel cables, clutch members 81 and 84 are provided. When it is necessary to independently adjust impact unit B, the clutch members are disengaged by rotation of clutch reaction arm 110. Clutch reaction arm 110 has a pair of spaced fingers 111 at one end each of which carries a pin 112 which extends into external slot 83 in clutch member 81. The clutch reaction arm is pivoted at 113 to horizontal cross member 21, and its other end is attached to an air cylinder 114 by a clevis 115. The opposite end of air cylinder 114 is attached to a clevis 116 of a bracket 117 which is welded to the upper surface of cross member 21. The air cylinder is provided with an air inlet hose 118 and an air outlet hose 119. The supply and exhaust of air to and from cylinder 114 is controlled by a valve on control panel 125.

When air is supplied to cylinder 114, the rod of the cylinder piston extends outwardly and clutch reaction arm 110 is pivoted about pivot 113 to move clutch member 81 along shaft 76 toward collar 89 and remove pins 82 on clutch member 81 from the openings in the face of clutch member 84 and permit rotation of sprockets 79 and 87 without rotation of shaft 76. Shaft 75 is then rotated by turning a crank fitted to square end 78 of shaft 75 to raise impact unit B without moving impact unit A. Thus, impact unit B is raised to bring the steel cables extending therefrom into the same horizontal plane as the steel cables extending from impact unit A.

Control panel 125 mounted on the side of the apparatus has independent controls for conveyor belt drive motor 15, motors 43 of impact units A and B, motor 103 for rapidly raising and lowering the impact units and for the fan and vacuum pump for exhausting dust from cabinet 22 during operation of the apparatus. These are standard electric controls which are well known to those skilled in the art. The control panel also has a valve for operating air cylinder 114.

By utilizing the apparatus of the invention it is possible to rapidly and inexpensively remove slag from the upper surface of shapes passing beneath impact heads A and B by the application of substantially horizontal force to shapes W without damaging the shapes. Additionally, the apparatus will comply with environmental standards since substantially all of the dust and particulates will pass out of the cabinet through exhaust opening 34 and conduit 35 to a dust collector. The apparatus is safe to operate because of anti-kick members 31 at inlet opening 26 of cabinet 22. The apparatus is capable of cleaning shapes of varying widths because of the overlapping arrangement of impact heads at the center line of the conveyor belt and is capable of cleaning shapes of varying thicknesses because of the vertical adjustment of the impact heads.

While a specific embodiment of the invention has been described hereinabove, it will be understood that it may be embodied within the scope of the appended claims.

We claim:

1. Apparatus for removing slag from surfaces of metal shapes, said apparatus including a conveyor belt, at least one vertically movable impact unit located above said conveyor belt, said impact unit including an impact head and means to rotate said impact head, means to adjust the vertical position of said impact unit, a substantially closed cabinet surrounding said impact unit and that portion of said conveyor belt above which said impact unit is located, said cabinet having inlet and outlet openings for said conveyor belt, said impact head including a disc having a peripheral groove formed in the upper surface and an aligned peripheral groove formed in the lower surface, radially aligned pairs of holes extending between said grooves throughout the circumference of said disc, a flexible steel cable extending from said groove formed in the upper surface of said disc through each pair of radially aligned holes and into and through said groove formed in the lower surface of said disc with its ends located below the lower surface of said disc, whereby the ends of said flexible steel cables contact slag on the surfaces of metal shapes passing below said impact head on said conveyor belt and knock the slag off of the surface of the metal shapes by the application of a substantially horizontal force to said slag.

2. Apparatus as set forth in claim 1 wherein said apparatus includes a plurality of impact units having an impact head spaced above said conveyor belt, the diameter of the impact head of each unit being such that the impact heads overlap at the center line of said conveyor belt to insure contact between flexible steel cable ends and slag on the surfaces of metal shapes.

3. Apparatus as set forth in claim 1 or 2 wherein said impact head includes a support plate having a hub at its center, a cover plate located next to one side of said support plate, and said disc located next to the other side of said cover plate and attached to said support plate.

4. Apparatus as set forth in claim 1 or 2 wherein said peripheral groove formed in the upper surface of said disc is filled with babbitt metal to hold said flexible steel cables in place in said disc, whereby said steel cables can be easily removed from said disc by heating said babbitt metal.

5. Apparatus as set forth in claim 1 or 2 wherein said means to rotate said impact head is an electric motor having a shaft connected to said impact head.

6. Apparatus as set forth in claim 1 or 2 wherein said means for vertically adjusting said impact unit is a screw jack and means to turn said screw jack to change the vertical position of said impact unit.

7. Apparatus as set forth in claim 6 wherein said means to turn said screw jack is an electric motor.

8. Apparatus as set forth in claim 6 wherein said means to turn said screw jack is a manually actuated linkage.

9. Apparatus as set forth in claim 1 or 2 wherein said apparatus includes a vertical plate located within said cabinet and extending across said conveyor belt and having a lower edge spaced above said conveyor belt, spaced vertical tracks mounted on said plate and said impact unit including slide means located within said tracks, a horizontal plate located within said cabinet above said tracks, a screw jack supported on said horizontal plate, means connecting said screw jack and said slide means and means for turning said screw jack, whereby movement of said screw jack moves said slide means along said tracks to change the vertical position of said impact unit.

10. Apparatus as set forth in claim 9 wherein said means for turning said screw jack is an electric motor.

11. Apparatus as set forth in claim 9 wherein said means for turning said screw jack is a shaft coupled to the drive of said screw jack having a square end adapted to receive a crank to manually raise and lower said impact unit.

12. Apparatus as set forth in claim 2 wherein said means to adjust the vertical position of each of said impact heads is a screw jack, a drive shaft for turning each screw jack, a shaft coupled to one of said drive shafts, a square end on said shaft adapted to receive a crank to rotate said shaft, a sprocket attached to said shaft, a shaft connected to the drive shaft of said second screw jack, the shaft coupled to the drive shaft of said second screw jack having clutch means attached thereto, means for actuating said clutch means to engage and disengage said shaft coupled to the drive shaft of said second screw jack, said shaft coupled to the drive shaft of said second screw jack having a locking means thereon to lock said shaft in position, a sprocket on said clutch means and a chain extending between said sprockets, whereby rotation of one of said shafts will rotate the other of said shafts when said clutch means is engaged.

13. An impact element having a disc with a peripheral groove formed in one surface and an aligned peripheral groove formed in the other surface, radially aligned pairs of holes extending between said grooves throughout the circumference of said disc, a flexible steel cable extending from one of said grooves through each pair of radially aligned holes and into and through the other of said grooves with ends extending past a surface of said disc.

14. An impact element as set forth in claim 13 wherein said impact element includes a support plate having a hub at its center, a cover plate located next to one side of said support plate, and said disc located next to the other side of said cover plate attached to said support plate.

15. An impacted element as set forth in claim 13 or 14 wherein one of said grooves formed in a surface of said disc is filled with babbitt metal to hold said flexible steel cables in place in said groove.

16. An impact element as set forth in claim 13 including a plurality of recesses formed in one surface of said disc and a plurality of recesses formed in the other surface of said disc and being aligned with the recesses in the first surface, said recesses being located in said disc inwardly of said aligned grooves, a pair of radially aligned holes extending between said aligned recesses, a flexible steel cable extending from one of said recesses through a pair of radially aligned holes and into and through the other of said recesses with ends extending past a surface of said disc.

17. An impact element as set forth in claim 16 wherein said recesses formed in one surface of said disc are filled with babbitt metal to hold said flexible steel cables in place in said recesses.

* * * * *

UNITED STATES PATENT AND TRADEMARK OFFICE
CERTIFICATE OF CORRECTION

PATENT NO. : 4,372,020

DATED : February 8, 1983

INVENTOR(S) : Harry E. Anderson et sl.

It is certified that error appears in the above-identified patent and that said Letters Patent is hereby corrected as shown below:

In the drawings Fig. 4 should be deleted to appear as per attached sheet.

Column 2, line 57, "the" first occurrence should read -- The --.

Column 4, line 39, "70" should read -- 70' --.

Column 4, line 40, "70'" should read -- 70 --.

Column 4, line 45, "70" should read -- 70' --.

Column 5, line 24, "70'" should read -- 70 --.

Column 5, line 54, "B" should read -- A --.

Column 5, line 57, "B" should read -- A --.

Signed and Sealed this

Fourteenth Day of August 1984

|SEAL|

Attest:

GERALD J. MOSSINGHOFF

Attesting Officer

Commissioner of Patents and Trademarks

FIG. 4